United States Patent
Belnap et al.

(10) Patent No.: US 6,651,757 B2
(45) Date of Patent: *Nov. 25, 2003

(54) TOUGHNESS OPTIMIZED INSERT FOR ROCK AND HAMMER BITS

(75) Inventors: Dan Belnap, Pleasant Grove, UT (US); Nathan Anderson, Pleasant Grove, UT (US); Michael A. Siracki, The Woodlands, TX (US); Sujian Huang, The Woodlands, TX (US)

(73) Assignee: Smith International, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/858,857

(22) Filed: May 16, 2001

(65) Prior Publication Data

US 2002/0043407 A1 Apr. 18, 2002

Related U.S. Application Data

(63) Continuation-in-part of application No. 09/206,827, filed on Dec. 7, 1998, now Pat. No. 6,290,008.
(60) Provisional application No. 60/205,315, filed on May 18, 2000.

(51) Int. Cl.$^7$ ............................................. E21B 10/00
(52) U.S. Cl. ................... 175/374; 175/420.2; 175/426; 175/434
(58) Field of Search ................. 175/374, 426, 175/420.2, 434, 420.1, 425, 411

(56) References Cited

U.S. PATENT DOCUMENTS

| | | | |
|---|---|---|---|
| 4,525,178 A | | 6/1985 | Hall ............................. 51/309 |
| 4,534,773 A | | 8/1985 | Phaal et al. ................... 51/293 |
| 4,604,106 A | | 8/1986 | Hall ............................. 51/293 |
| 4,694,918 A | | 9/1987 | Hall ............................. 175/329 |
| 5,370,195 A | * | 12/1994 | Keshavan et al. ........ 175/420.2 |
| 6,102,140 A | * | 8/2000 | Boyce et al. ................ 175/374 |
| 6,227,318 B1 | * | 5/2001 | Siracki ........................ 175/426 |
| 6,241,035 B1 | * | 6/2001 | Portwood .................... 175/374 |
| 6,290,008 B1 | * | 9/2001 | Portwood et al. ......... 175/420.1 |

FOREIGN PATENT DOCUMENTS

| | | |
|---|---|---|
| GB | 2 282 833 | 4/1995 |
| GB | 2 345 503 | 7/2000 |

* cited by examiner

Primary Examiner—David Bagnell
Assistant Examiner—Jennifer R. Dougherty
(74) Attorney, Agent, or Firm—Rosenthal & Osha L.L.P.

(57) ABSTRACT

An insert for a drill bit is disclosed which includes an exposed surface having a contact portion adapted to periodically contact earthen formation. The contact portion includes a polycrystalline diamond material having a hardness in the range of about 2000 HV to about 3000 HV. In some embodiments, the polycrystalline diamond material includes a composite having a first phase material including polycrystalline diamond and a second phase material selected from the group of oxide particulates metal carbides, and metallic particulates, nitrides, and mixtures of thereof.

31 Claims, 4 Drawing Sheets

TOUGHNESS OPTIMIZED INSERT FOR ROCK AND HAMMER BITS

CROSS-REFERENCE TO RELATED APPLICATIONS

This is a continuation in part of application Ser. No. 09/206,827 now U.S. Pat. No. 6,290,008 filed on Dec. 7, 1998 and assigned to the assignee of the present invention. This application also claims benefit of provisional application Ser. No. 60/205,315 filed on May 18, 2000.

BACKGROUND OF THE INVENTION

1. Field of the Invention

The invention relates generally to cutting elements ("inserts") used on rock bits such as roller cone rock bits, hammer bits and drag bits. More specifically, the invention relates to optimizing the toughness of an insert by lowering its hardness to increase the effective drilling life of the insert for its particular drilling application.

2. Background Art

Polycrystalline diamond ("PCD") enhanced inserts and tungsten carbide ("WC—Co") inserts are two commonly used inserts for roller cone rock bits and hammer bits. Roller cone rock bits include a bit body adapted to be coupled to a rotatable drill string and include at least one "cone" that is rotatably mounted to the bit body. The cone has a plurality of inserts pressed into it. The inserts contact with the formation during drilling. Hammer bits are typically include a one piece body with having crown. The crown includes inserts pressed therein for being cyclically "hammered" and rotated against the earth formation being drilled.

The PCD layer on PCD enhanced inserts is extremely hard. As a result, the PCD layer has excellent wear resistance properties. While the actual hardness of the PCD layer varies for the inserts used in each of the foregoing bit types, each type of PCD has a common failure mode of chipping and spalling due to cyclical impact loading on the inserts during drilling. Conversely, the softer, tougher tungsten carbide inserts tend to fail by excessive wear and not by chipping and spalling. Therefore a need exists for inserts for roller cone and hammer bits that are optimized for resisting both wear and impact as encountered during drilling.

SUMMARY OF THE INVENTION

One aspect of the invention is an insert for a drill bit is disclosed which includes an exposed surface having a contact portion adapted to periodically contact earthen formation. The contact portion includes a polycrystalline diamond material having a hardness in the range of about 2000 HV to about 3000 HV.

In some embodiments, the insert is attached to a roller cone on a roller cone bit. In some embodiments, the insert is attached to a crown on a hammer bit.

In some embodiments, the polycrystalline diamond material includes a composite having a first phase material including polycrystalline diamond and a second phase material selected from the group of oxide particulates metal carbides, and metallic particulates, nitrides, and mixtures of thereof.

Another aspect of the invention is a rock bit including a body, at least one cutter rotatably mounted on the body, and at least one insert disposed in the at least one cutter. The at least one insert has an exposed surface having a contact portion thereon adapted to periodically contact earthen formation as the cutter rotates. The contact portion comprises a polycrystalline diamond material, which itself comprises a composite material. The composite material comprises a first phase material comprising polycrystalline diamond, and a second phase material selected from the group of oxide particulates metal carbides, and metallic particulates, nitrides, and mixtures of thereof.

In some embodiments, the polycrystalline diamond material has a hardness in a range of about 2000 to 3000 Vickers Hardness Units (HV).

Other aspects and advantages of the invention will be apparent from the accompanying drawings, description and appended claims.

DETAILED DESCRIPTION

Various embodiments of the invention provide a toughness-optimized PCD surface for inserts used on drill bits. It is known in the art that hardness of a PCD surface on an insert, or PCD material used to make the insert, generally correlates with its wear resistance. It is also known in the art that the toughness of the PCD layer, or material used to make the insert, generally correlates to its impact resistance. Generally speaking, the harder the material is the less toughness it has, and vice versa. This trade off between hardness and toughness extends to wear resistance and impact resistance. While wear resistance is an important property of drill bit inserts, the present invention optimizes the trade off between wear resistance and impact resistance to provide an insert better suited for its bit type and formation to be drilled.

More specifically, it has been determined through analysis of worn out ("dull") roller cone bits that many PCD-enhanced inserts have more wear resistance than may be necessary for their respective drilling application. This conclusion is based on the failure mode of the inserts being chipping or spalling, which is characteristic of impact failure. Impact failure is indicative of insufficient toughness of the insert. Toughness as previously explained, is generally inversely related to the hardness and wear resistance of the particular insert. Thus, the wear resistance of typical PCD enhanced inserts can be reduced, while a corresponding gain in impact resistance and/or fatigue life can be expected to provide a disproportionate increase in the overall insert life during actual drilling use. That is, even though the wear resistance of the insert may be reduced, the effective life of the insert is increased due to the postponement or elimination of the impact failure mode. For purposes of simplicity, the term "impact resistance" will be used generically also to include fatigue failure. Fatigue failure also increases as the hardness of PCD increases.

Figure 1:
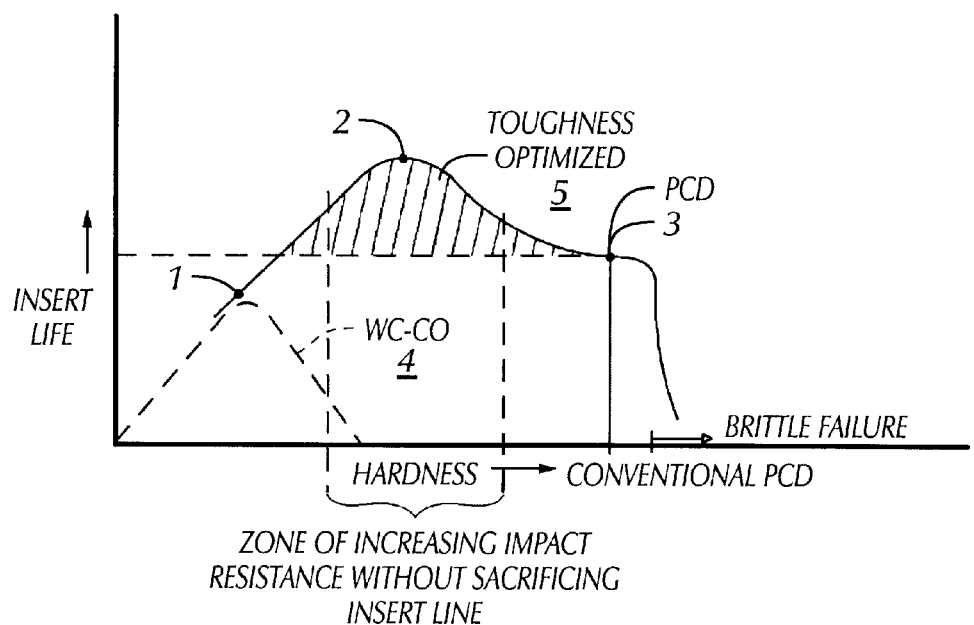
FIG. 1 is a conceptual graph of wear resistance versus hardness of a PCD insert.

FIG. 1 shows this concept in graphic form. The y-axis on the graph of FIG. 1 generally represents insert life which can be empirically evaluated from analysis of dull bits. The x-axis in the graph of FIG. 1 represents the hardness of the PCD surface of PCD-enhanced inserts. This hardness can be determined by standard hardness testing techniques. "Insert life" represents the approximate time an insert drills through earth formations until it becomes excessively worn. Wear can result from either abrasive erosion of the insert, or chipping and spalling caused by cyclical impact loading. Excessive wear renders the insert ineffective for drilling. This condition can be indicated by a sharp decrease in the rate of penetration ("ROP") of the bit during drilling, and is confirmed by dull bit evaluation. Additionally, there may be at some point simulation methods to predict insert life when the insert is used to drill through selected formations.

It can be observed at point 1 on the graph in FIG. 1 that a low hardness provides relatively low insert life. Increasing hardness thereafter, up to a point, generally increases insert life. The predominant insert failure mode between points 1 and 2 tends to be excessive wear of the insert. However, there appears to be a point (shown at point 2) beyond which insert life begins to decrease despite the increase in hardness of the insert material. An insert with a hardness at point 3 may actually have a shorter life than an insert at point 2, because impact failure may cause the insert to fail prematurely. An insert at point 3 is more wear resistant than an insert at point 2, but at hardness values higher than at point 2, impact failure becomes the prevailing failure mode. The invention provides an insert which has a hardness shown at point 2 so that the hardness and toughness are optimally selected to withstand both impact fatigue and wear to achieve the longest insert life for the particular insert application.

For comparison purposes, a typical tungsten carbide insert life curve has been included on FIG. 1, shown at 4, along with point 3 representing conventional PCD. It can be observed that the higher hardness PCD, at point 3, can be expected to have a longer insert life than tungsten carbide, but there still exists an area of improvement for insert life, as shown in the hatched area 5. The present invention provides an insert that has a hardness that falls between point 3 and 4 on the hardness scale so that the insert life is maximized for a particular drilling application. In other words, the inserts of the present invention are substantially toughness optimized, as represented under point 2 in FIG. 1.

The hardness value of points 2 and 3 on the curve of FIG. 1 depends on the type of drill bit, the location of the insert on the drill bit, the type of earth formation to be drilled, and the drilling parameters such as weight on bit and rotary speed (RPM). For example, toughness optimized inserts used in hammer bits will generally have a higher hardness than toughness optimized inserts used in roller cone bits. However, the one thing that will be consistent is that each of these toughness optimized inserts will have a lower hardness than a corresponding conventional insert for the same drill bit and application. That is, each insert will move into the hatched area in FIG. 1 to achieve a higher insert life for the particular application.

PCD is a well known and commonly used material for drilling inserts. PCD can have a variety of geometries when used on inserts used in drill bits, for example, thin layers or thick masses disposed on substrates, a variety of exterior shapes for contacting the formation, a variety of non-planar interfaces with a substrate, or the entire insert being PCD. PCD may have a variety of additional materials combined with the PCD, for example, cobalt and tungsten carbide, that are added for purposes unrelated to the present invention. For example, cobalt up to about 10% by volume is typically used to aid the sintering process. U.S. Pat. No. 5,370,195 discloses an outer PCD layer including carbides or carbonitrides in a range of up to 8% by volume; however, this percentage is considered insufficient to increase the impact resistance to the extent contemplated by the present invention.

One constant aspect of the definition of PCD is the use of a high temperature/high pressure ("HT/HP") process for sintering "green" PCD to create intercrystalline bonding between diamond crystals. "Sintering" as used herein refers to a HT/HP process for pressing green PCD. HT/HP processes are well known in the art. For example, U.S. Pat. No. 5,370,195 discloses a HT/HP process. U.S. Pat. No. 4,525,178 discloses a typical use of diamond crystals with cobalt powder as a binder that is formed in a green state, and then is pressed through a HT/HP press to yield a PCD with strong intercrystalline bonding. PCD, by its very name, has intercrystalline bonding between diamond crystals. The HT/HP process only needs to provide sufficient time, temperature and pressure to create this intercrystalline bonding. This is so even when other materials such as tungsten carbide are pressed along with the green diamond crystals. In some cases there may be so much additional material, such as tungsten carbide or cobalt as explained earlier, that appreciable intercrystalline bonding is effectively prevented during the sintering process. Such a material is not within the definition of the term PCD where appreciable intercrystalline bonding has not occurred. On the other hand, intercrystalline bonding is present if the additional material has merely lessened the degree of intercrystalline contact between adjacent diamond crystals. For example, diamond crystals mixed with any second material (second phase) such that the diamond is less than about 20% by volume generally would not be expected to have appreciable intercrystalline bonding. However, the true measure of whether there is intercrystalline bonding is by examination of the specific micro structure of any composition of diamond and additional materials.

Figure 2:
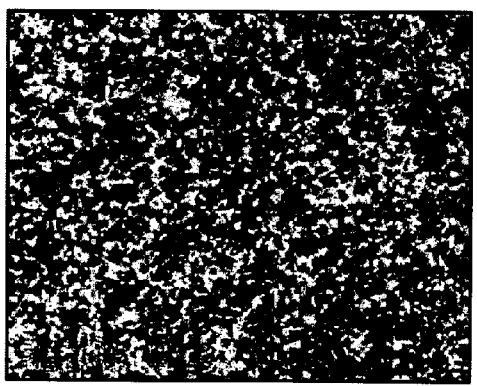
FIG. 2 is a picture of a microstructure having dense intercrystalline bonding in a PCD material.
Figure 3:
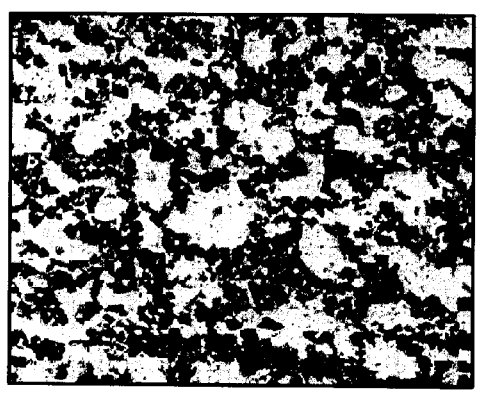
FIG. 3 is a picture of a microstructure having less dense intercrystalline bonding in a PCD material.

The degree of intercrystalline bonding correlates with the hardness of the PCD. Very dense intercrystalline bonding results in the highest hardness, as shown in FIG. 2. More widely dispersed intercrystalline bonding results in a lower hardness, as shown in FIG. 3. More widely disposed intercrystalline bonding typically results in higher toughness and impact resistance.

Figure 4:
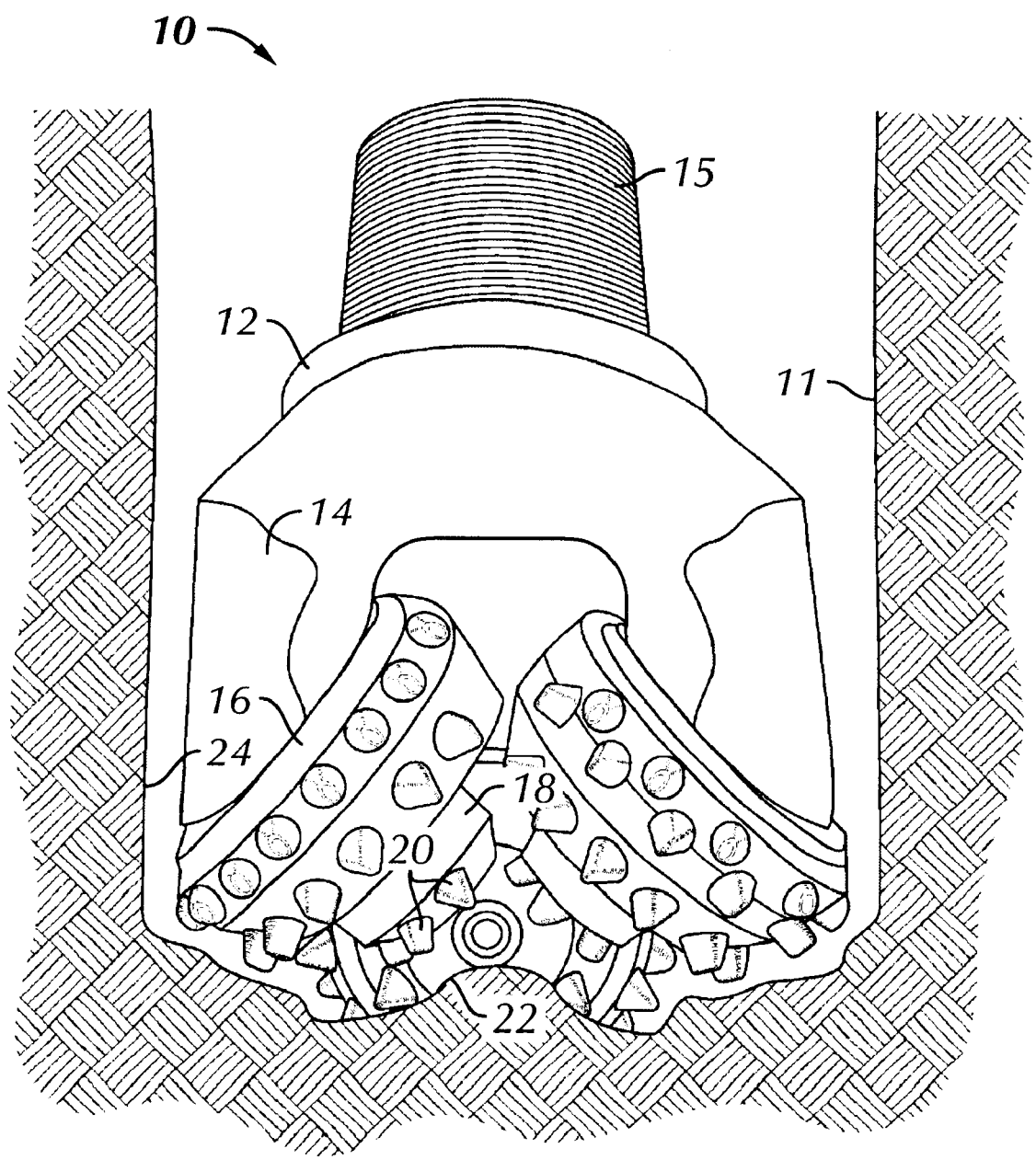
FIG. 4 is a side view of a roller cone rock bit.

Referring to FIG. 4, a roller cone rock bit 10 according to the preferred roller cone bit embodiment of the present invention is shown disposed in a borehole 11. The bit 10 has a body 12 with legs 14 extending generally downward, and a threaded pin end 15 opposite thereto for attachment to a drill string (not shown). Journal shafts 16 are cantilevered from legs 14. Rolling cutters (or roller cones) 18 are rotatably mounted on journal shafts 16. Each cutter 18 has a plurality of inserts 20 mounted thereon. As the body 10 is rotated by rotation of the drill string (not shown), the cutters 18 rotate over the borehole bottom 22 and maintain the gage of the borehole by rotating against a portion of the borehole sidewall 24. As the cutter 18 rotates, individual inserts are rotated into contact with the formation and then out of contact with the formation. As a result, the inserts undergo cyclical loading which can contribute to fatigue failure. Inserts 26 are called "gage" inserts because they contact, at least partially, the sidewall 24 to maintain the gage of the borehole 11. All of the inserts, and particularly gage inserts 26, undergo repeated impact loading as they are rotated into and out of contact with the earth formation.

Figure 5:
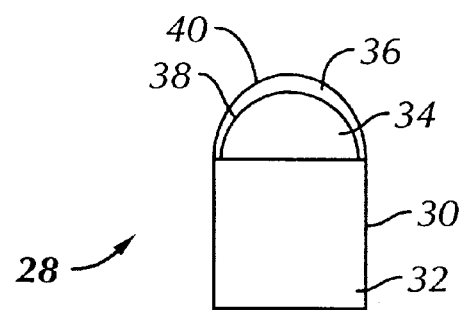
FIG. 5 is a cross-sectional view of one preferred embodiment of an insert according to the present invention.

Referring to FIG. 5, a cross-section of one embodiment of an insert 28 according to the present invention is shown. The insert 28 may be used as any one of the inserts 20 but has particular application as a gage insert 26. Insert 28 has a substrate 30 with a grip portion 32 and an extension portion 34. The grip portion 34 is sized for a press fit within sockets formed in rolling cutters 18. An outer layer 36 is located on the extension portion 32. Outer layer 36 has an inner surface 38 and a contact surface 40 opposite thereto for contacting the borehole. The embodiment of FIG. 5 shows the outer layer 36 as covering the entire extension portion 34; however, it should be understood that the outer layer 36 may only cover a part of the extension portion 34. Additionally, there may be other layers interposed between the outer layer 36 and the substrate 30. See, for example, transition layers as disclosed in U.S. Pat. No. 4,694,918.

The outer layer 36 comprises a composite PCD material. Preferably for a roller cone bit application, the contact surface 40 of the outer layer 36 has a hardness of between about 2000 to 3000 Vickers Hardness Units (HV). This hardness provides a resulting increase in impact resistance that is beneficial for inserts used in roller cone drill bits, while not significantly sacrificing wear resistance. In some embodiments, the PCD hardness is within a range of about 2000 to 2500 HV. In other embodiments, the PCD hardness is within a range of about 2500 to 3000 HV.

Figure 6:
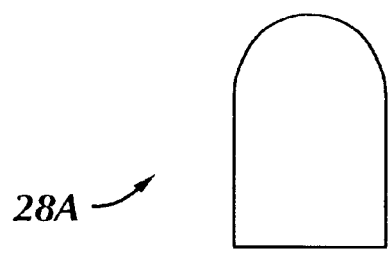
FIG. 6 is a cross-sectional view of an alternative embodiment of an insert according to the present invention.

An alternative embodiment of an insert is shown in FIG. 6. The insert 28A in the embodiment of FIG. 6 is made substantially entirely from a composite PCD material made as previously described herein and having a hardness in a range of about 2000 to 3000 HV. In some embodiments, the PCD hardness is within a range of about 2000 to 2500 HV. In other embodiments, the composite PCD material hardness is within a range of about 2500 to 3000 HV.

Figure 7:
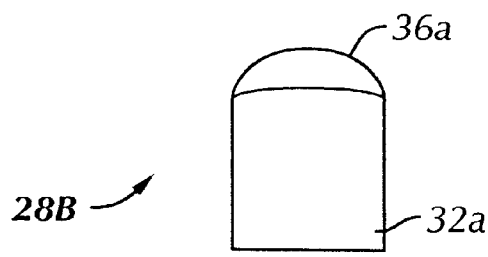
FIG. 7 is a cross-sectional view of another alternative embodiment of an insert according to the present invention.

Yet another embodiment of an insert is shown in FIG. 7 at 28B. The insert 28B includes a generally cylindrical substrate 32A and a generally convex-shaped contact surface 36A disposed at one end of the substrate. The contact surface is placed into recurrent contact with the earth formation as the drill bit is operated. The contact surface 36A is formed from composite PCD material made as explained herein previously, and preferably has a hardness in a range of about 2000 to 3000 HV. In some embodiments, the composite PCD material hardness is within a range of about 2000 to 2500 HV. In other embodiments, the composite PCD material hardness is within a range of about 2500 to 3000 HV.

A suitable technique for measuring the hardness of the composite PCD material used in an insert according to the invention is described as follows. A sectioned insert is lapped with sequentially-decreasing grit lapping compound down to 1–3 micron diamond grit. This lapped surface is then subjected to contact with a high-speed, resin-bonded diamond wheel for final polishing. Hardness is typically measured at a location on the polished PCD surface, preferably near the contact surface. The hardness testing procedure uses a Vicker's indenter with a 500 gram load on a conventional microhardness testing apparatus. The indenter loading and measurement of the resulting hardness impressions are performed using procedures known in the art.

In preferred embodiments of a composite PCD material made according to the invention, an additional material, referred to as a "second phase" material, is added to diamond crystals to reduce the intercrystalline bonding which decreases the hardness and thereby increases the toughness and impact resistance. Together, the polycrystalline diamond and the second phase material form a composite material that undergoes HT/HP processing to form a composite PCD material. One preferred second phase material is tungsten carbide-cobalt (WC—Co). However, the second phase material could be any covalent, ionic, or metallically bonded substance which sufficiently interferes with intercrystalline bonding of the diamond during the HT/HP process. Examples of such substances include: particulate oxides, for example, aluminum oxide and zirconium oxide; metal such as of tungsten, vanadium, titanium; and metallic particulates such as cobalt, nickel, and iron; nitrides; and mixtures of any or all of the foregoing materials. In some embodiments, the second phase material makes up about 10 to 60 percent by volume of the composite material formed into PCD by the HP/HT process. More preferably, the second phase material forms 20 to 50 percent by volume of the composite material.

One measure used to determine the toughness of a PCD-enhanced insert is an impact test. An insert is placed in a rigid fixture, and a selected weight is dropped from predetermined heights. The PCD surface is then observed for chipping or other signs of impact damage. The maximum height, termed "drop height", that an insert can withstand the drop test is a measure of the impact resistance, and thus toughness, of the insert.

EXAMPLE

In an example of a composite PCD material made according to the invention, 60% by volume of diamond and 40% by volume of precemented tungsten carbide powder were combined and sintered. The average diamond grain size was about 6 microns and the average precemented tungsten carbide grain size was about 20 microns. The resulting hardness of the composite PCD material was 2300 HV. The relative improvement in impact resistance as compared to conventional PCD was about 100%, with the drop height increasing from about 45 inches for a conventional PCD enhanced insert to about 97 inches for an composite PCD enhanced insert according to the example.

Figure 8:
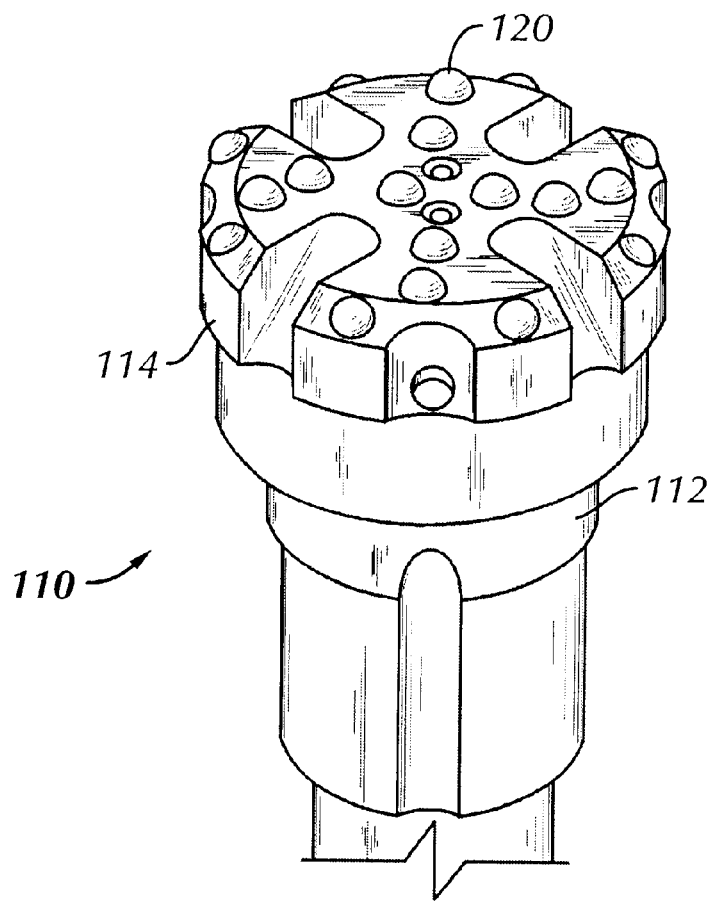
FIG. 8 is a side view of a hammer bit.
Figure 8A:
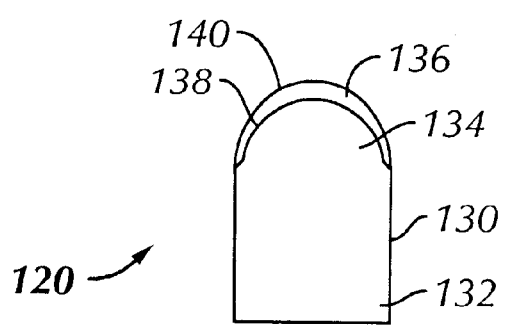
FIG. 8A is a cross-sectional view of one embodiment of an insert preferred for use in a hammer bit.

FIGS. 8 and 8A illustrate an embodiment of a hammer bit having inserts made according to the invention. The hammer bit 110 has a body 112 with a head 114 at one end thereof. The body 112 is received in a hammer (not shown), and the hammer moves the head 114 against the formation to fracture the formation. Inserts 120 are mounted in the head 114. The inserts 120 are preferably semi-round top (SRT) inserts with a substrate 130 and a grip portion 132. The grip portion 132 is pressed into the head 114 and an extension portion 134 extends from the head 114. An outer layer 136 is formed from composite PCD material, made as previously explained, with inner surface 138 toward substrate 130 and contact surface 140 opposite thereto for impacting borehole bottom 122 and/or sidewall 124. For a hammer bit insert 120, it is preferred that the hardness of contact surface 140 be between about 2000 and 3000 HV. The hardness of the composite PCD layer (outer layer 136) is preferably made as discussed above with respect to roller cone bit insert 20.

Although the present invention has been described with respect to a limited number of embodiments, various changes, substitutions and modifications may be suggested to one skilled in the art and it is intended that the present invention encompass such changes, substitutions and modifications as fall within the scope of the appended claims.

Accordingly, the scope of the invention is to be limited only by the appended claims.

What is claimed is:

1. A rock bit, comprising:
   a body;
   at least one cutter rotatably mounted on the body; and
   at least one insert disposed in the at least one cutter, the at least one insert comprising an exposed surface having a contact portion thereon adapted to periodically contact earthen formation as the at least one cutter rotates, the contact portion comprising a polycrystalline diamond material, wherein the polycrystalline diamond material comprises a composite material comprising a first phase material comprising polycrystalline diamond, and at least 10 percent by volume of a second phase material selected from the group of oxide particulates, metal carbides, metallic particulates, nitrides, and mixtures thereof,
   the polycrystalline diamond having a hardness in the range of about 2000 Vickers Hardness Units to about 3000 Vickers Hardness Units.

2. The bit of claim 1 wherein the hardness of the polycrystalline diamond is in the range of about 2000 Vickers Hardness Units to about 2500 Vickers Hardness Units.

3. The bit of claim 1 wherein the hardness of the polycrystalline diamond is in the range of about 2500 Vickers Hardness Units to about 3000 Vickers Hardness Units.

4. The bit of claim 1 wherein the second phase material is between about 10 and 60 percent by volume of the composite material.

5. The bit of claim 1 wherein the second phase material is between about 20 and 50 percent by volume of the composite material.

6. The rock bit of claim 1 wherein the at least one insert comprises a substrate material having the polycrystalline diamond material disposed on an outer surface thereof.

7. The rock bit of claim 6 further comprising at least one additional layer interposed between the polycrystalline diamond material and the substrate material.

8. The rock bit of claim 1 wherein the contact portion comprises at least a portion of a convex surface formed on the insert.

9. An insert for a drill bit comprising an exposed surface having a contact portion thereon adapted to contact earthen formation, the contact portion comprising a polycrystalline diamond material, wherein the polycrystalline diamond material comprises a composite material comprising a first phase material comprising polycrystalline diamond, and at least 10 percent by volume of a second phase material selected from the group of oxide particulates, metal carbides, metallic particulates, nitrides, and mixtures thereof,
   the polycrystalline diamond having a hardness in a range of about 2000 Vickers Hardness Units to about 3000 Vickers Hardness Units.

10. The insert of claim 9 wherein the hardness of the polycrystalline diamond is within a range of about 2000 Vickers Hardness Units to about 2500 Vickers Hardness Units.

11. The insert of claim 9 wherein the hardness of the polycrystalline diamond is within a range of about 2500 Vickers Hardness Units to about 3000 Vickers Hardness Units.

12. The insert of claim 9 wherein the second phase material is between about 10 and 60 percent by volume of the composite polycrystalline diamond material.

13. The insert of claim 9 wherein the second phase material is between about 20 and 50 percent by volume of the composite polycrystalline diamond material.

14. The insert of claim 9 wherein the insert comprises a substrate material having the polycrystalline diamond material disposed on an outer surface thereof.

15. The insert of claim 14 further comprising at least one additional layer interposed between the composite polycrystalline diamond material and the substrate material.

16. The insert of claim 9 wherein the contact portion comprises at least a portion of a convex surface formed on the insert.

17. The insert of claim 9 wherein the insert is disposed in a crown of a hammer bit.

18. The insert of claim wherein the insert is disposed in a roller cone of a roller cone bit.

19. A rock bit, comprising:
    a body;
    at least one cutter rotatably mounted on the body; and
    at least one insert disposed in the at least one cutter, the at least one insert comprising an exposed surface having a contact portion thereon adapted to periodically contact earthen formation as the at least one cutter rotates, the contact portion comprising a polycrystalline diamond material, the polycrystalline diamond material comprising a composite material, the composite material comprising a first phase material comprising polycrystalline diamond, and a second phase material selected from the group of oxide particulates, metal carbides, metallic particulates, nitrides, and mixtures thereof, the second phase material being between about 20 and 50 percent by volume of the composite material.

20. The hammer bit of claim 19 wherein a hardness of the polycrystalline diamond is in the range of about 2000 Vickers Hardness Units to about 3000 Vickers Hardness Units.

21. The rock bit of claim 20 wherein a hardness of the polycrystalline diamond is in the range of about 2500 Vickers Hardness Units to about 3000 Vickers Hardness Units.

22. The rock bit of claim 20 wherein a hardness of the polycrystalline diamond is in the range of about 2000 Vickers Hardness Units to about 2500 Vickers Hardness Units.

23. The rock bit of claim 19 wherein the insert is formed substantially entirely of the polycrystalline diamond material.

24. A hammer bit, comprising:
    a body with a shank portion for being received in a hammer assembly and a head portion opposite thereto for impacting rock formation; and
    at least one insert mounted on the head portion, the at least one insert comprising an exposed surface having a contact portion thereon, the contact portion comprising a polycrystalline diamond material, the polycrystalline diamond material comprising a composite material, the composite material comprising a first phase material comprising polycrystalline diamond, and a second phase material selected from the group of oxide particulates, metal carbides, metallic particulates, nitrides, and mixtures thereof, the second phase material being between about 20 and 50 percent by volume of the composite material.

25. The insert of claim 24 wherein a hardness of the polycrystalline diamond is in the range of about 2000 Vickers Hardness Units to about 3000 Vickers Hardness Units.

26. The hammer bit of claim 25 wherein a hardness of the polycrystalline diamond is in the range of about 2500 Vickers Hardness Units to about 3000 Vickers Hardness Units.

27. The hammer bit of claim wherein a hardness of the polycrystalline diamond is in the range of about 2000 Vickers Hardness Units to about 2500 Vickers Hardness Units.

28. An insert for a drill bit comprising an exposed surface having a contact portion thereon adapted to contact earthen formation, the contact portion comprising a polycrystalline diamond material, the polycrystalline diamond material comprising a composite material, the composite material comprising a first phase material comprising polycrystalline diamond, and a second phase material selected from the group of oxide particulates, metal carbides, metallic particulates, nitrides, and mixtures thereof, the second phase material being between about 20 and 50 percent by volume of the composite material.

29. The insert of claim 28 wherein a hardness of the polycrystalline diamond is in the range of about 2000 Vickers Hardness Units to about 3000 Vickers Hardness Units.

30. The insert of claim 29 wherein a hardness of the polycrystalline diamond is in the range of about 2500 Vickers Hardness Units to about 3000 Vickers Hardness Units.

31. The insert of claim 29 wherein a hardness of the polycrystalline diamond is in the range of about 2000 Vickers Hardness Units to about 2500 Vickers Hardness Units.

* * * * *

UNITED STATES PATENT AND TRADEMARK OFFICE
CERTIFICATE OF CORRECTION

PATENT NO. : 6,651,757 B2
DATED : November 25, 2003
INVENTOR(S) : Dan Belnap et al.

It is certified that error appears in the above-identified patent and that said Letters Patent is hereby corrected as shown below:

<u>Title page,</u>
Item [75], Inventors, please change first inventor's address from "Pleasant Grove" to
-- East Pleasant Grove --;

<u>Column 8,</u>
Line 9, please delete the second occurrence of "material";
Line 15, please add -- 9 -- after "claim"; and <u>Column 9,</u>
Line 5, please add -- 25 -- after "claim".

Signed and Sealed this

Eleventh Day of May, 2004

JON W. DUDAS
*Acting Director of the United States Patent and Trademark Office*